United States Patent
Vogt et al.

(10) Patent No.: US 10,386,835 B2
(45) Date of Patent: Aug. 20, 2019

(54) SYSTEM AND METHOD FOR EXTERNALLY INTERFACING WITH AN AUTONOMOUS VEHICLE

(71) Applicant: GM GLOBAL TECHNOLOGY OPERATIONS LLC, Detroit, MI (US)

(72) Inventors: Kyle Vogt, San Francisco, CA (US); Ian Rust, San Francisco, CA (US); Solomon Bier, San Francisco, CA (US); Drew Allyn Gross, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/398,552

(22) Filed: Jan. 4, 2017

(65) Prior Publication Data

US 2017/0192428 A1 Jul. 6, 2017

Related U.S. Application Data

(60) Provisional application No. 62/274,577, filed on Jan. 4, 2016, provisional application No. 62/274,586, filed
(Continued)

(51) Int. Cl.
| | | |
|---|---|---|
| *G05D 1/00* | (2006.01) | |
| *G01C 21/34* | (2006.01) | |
| *G05D 1/02* | (2006.01) | |
| *G01C 21/28* | (2006.01) | |
| *G07C 5/00* | (2006.01) | |

(52) U.S. Cl.
CPC ........... *G05D 1/0038* (2013.01); *G01C 21/28* (2013.01); *G01C 21/3438* (2013.01); *G01C 21/3461* (2013.01); *G01C 21/3492* (2013.01); *G05D 1/0016* (2013.01); *G05D 1/0027* (2013.01); *G05D 1/0077* (2013.01);
(Continued)

(58) Field of Classification Search
CPC ............ G05D 1/0038; G05D 10/0016; G05D 1/0027; G05D 1/0077; G05D 1/0088; G05D 1/0212; G05D 1/0238; G05D 1/0257; G05D 1/0278; G05D 1/0287; G05D 2201/0213;
(Continued)

(56) References Cited

U.S. PATENT DOCUMENTS

| | | | | |
|---|---|---|---|---|
| 2003/0102688 A1* | 6/2003 | Bingle | ................... | E05B 83/26 296/76 |
| 2004/0027237 A1* | 2/2004 | Magner | .............. | G07C 9/00182 340/5.54 |

(Continued)

OTHER PUBLICATIONS

U.S. Appl. No. 15/398,454; NonFinal Office Action—Notification Date Aug. 29, 2018.
(Continued)

*Primary Examiner* — Shardul D Patel
(74) *Attorney, Agent, or Firm* — Lorenz & Kopf LLP

(57) ABSTRACT

A method for controlling an autonomous vehicle using an external interface is disclosed. The method includes an external interface that is in operable communication with one or more control systems of the autonomous vehicle. The method allows an entity in proximity of an outside of the autonomous vehicle to interact with the external interface; receives from the entity one or more control inputs, and controls one or more operations of the autonomous vehicle based on the one or more control inputs.

20 Claims, 7 Drawing Sheets

Related U.S. Application Data on Jan. 4, 2016, provisional application No. 62/302,874, filed on Mar. 3, 2016.

(52) U.S. Cl.
CPC ......... *G05D 1/0212* (2013.01); *G05D 1/0238* (2013.01); *G05D 1/0257* (2013.01); *G05D 1/0278* (2013.01); *G05D 1/0287* (2013.01); *G05D 2201/0213* (2013.01); *G07C 5/008* (2013.01)

(58) Field of Classification Search
CPC ................ G01C 21/28; G01C 21/3438; G01C 21/3461; G01C 21/3492; G07C 5/008
USPC .................................... 701/2, 23, 49; 296/76
See application file for complete search history.

(56) References Cited

U.S. PATENT DOCUMENTS

| | | | | |
|---|---|---|---|---|
| 2006/0271261 | A1* | 11/2006 | Flores | B60Q 9/008 701/49 |
| 2014/0074338 | A1 | 3/2014 | Nordbruch | |
| 2015/0066284 | A1 | 3/2015 | Yopp | |
| 2015/0127208 | A1* | 5/2015 | Jecker | B62D 15/025 701/23 |
| 2015/0248131 | A1 | 9/2015 | Fairfield | |
| 2015/0338852 | A1* | 11/2015 | Ramanujam | G01C 21/26 701/2 |
| 2015/0339928 | A1* | 11/2015 | Ramanujam | G08G 1/202 701/23 |
| 2015/0346727 | A1* | 12/2015 | Ramanujam | B62D 15/0285 701/23 |
| 2015/0353033 | A1* | 12/2015 | Pribisic | H03K 17/962 307/115 |
| 2016/0125736 | A1* | 5/2016 | Shaik | G08G 1/14 701/23 |
| 2016/0249180 | A1 | 8/2016 | Li | |
| 2016/0334797 | A1 | 11/2016 | Ross | |
| 2018/0189717 | A1 | 7/2018 | Cao | |
| 2018/0231979 | A1* | 8/2018 | Miller | G06Q 30/0242 |

OTHER PUBLICATIONS

U.S. Appl. No. 15/398,577; NonFinal Office Action—Notification Date Dec. 5, 2018.

* cited by examiner

SYSTEM AND METHOD FOR EXTERNALLY INTERFACING WITH AN AUTONOMOUS VEHICLE

CROSS-REFERENCE TO RELATED APPLICATIONS

This application claims the benefit of U.S. Provisional Application Ser. No. 62/274,577, filed on 4 Jan. 2016, U.S. Provisional Application Ser. No. 62/274,586, filed on 4 Jan. 2016, and U.S. Provisional Application Ser. No. 62/302,874, filed on 3 Mar. 2016, which are incorporated in their entireties by this reference.

TECHNICAL FIELD

This invention relates generally to the vehicle automation field, and more specifically to new and useful systems and methods for externally interfacing with an autonomous vehicle.

BACKGROUND

Vehicle automation has been suggested as a means of improving vehicle safety for almost as long as cars have been in existence—experiments on autonomy in cars have been conducted since at least the 1920s. Only recently, though, has computer technology advanced enough to make true vehicle automation possible.

In addition to improving safety while driving, autonomous vehicles have the opportunity to enhance safety and enrich community resources even while parked. To fully take advantage of this opportunity; however, autonomous vehicles must be able to interact with their surroundings, and in particular, people within those surroundings.

Thus, there is a need in the vehicle automation field to create systems and methods for externally interfacing with an autonomous vehicle. This invention provides such new and useful systems and methods.

DETAILED DESCRIPTION

The following description of the preferred embodiments of the invention is not intended to limit the invention to these preferred embodiments, but rather to enable any person skilled in the art to make and use this invention.

Much of the focus on autonomous vehicles surrounds the potential for such vehicles to greatly reduce the number of deaths occurring due to traffic accidents, and deservedly so. This effect is one that benefits not only autonomous vehicle passengers, but also entire communities.

While increasing driving safety is of paramount importance, the ability of autonomous vehicles to contribute to the enrichment of communities is not limited to this area. In particular, autonomous vehicles have the opportunity to meaningfully interact with people not just in their capacity as passengers and pedestrians, but in any capacity; for example, as neighbors, as officers of the peace, and as persons in need of assistance.

The embodiments of the present application are directed to systems and methods for externally interfacing with an autonomous vehicle. These systems and methods may increase the ability for autonomous vehicles to add value to the communities in which they operate.

This externally interfacing system is particularly helpful in a situation or scenario in which an autonomous vehicle has lost connectivity with a controlling source or one or more sources of controlling data and assistance is desired. The lost connectivity can also be due to the autonomous vehicle being disconnected from a communication scheme, such as the Internet, a mesh network, or the like. A controlling source may be an autonomous vehicle control server. The one or more sources of controlling data may be data feeds from one or more of the autonomous vehicle's sensors. Additionally, other issues relating to the functionality or inoperability of the onboard computer, such as a confused or low confidence onboard computer or a damaged onboard computer due to a collision or other technical mishap. Any of the above-identified issues (including those described in U.S. Provisional Application No. 62/274,577, the entirety of which is incorporated by this reference) can be used to activate, trigger, and/or initiate the system and/or the external interface of the present application.

Accordingly, the embodiments of the present application provide systems and methods to address the above-noted issues by enabling local control of an autonomous vehicle using an external interface which locally communicates with an onboard computer and/or one or more operational components (e.g., engine, wheels, etc.) of the autonomous vehicle.

1. System for Externally Interfacing with an Autonomous Vehicle

Figure 1:
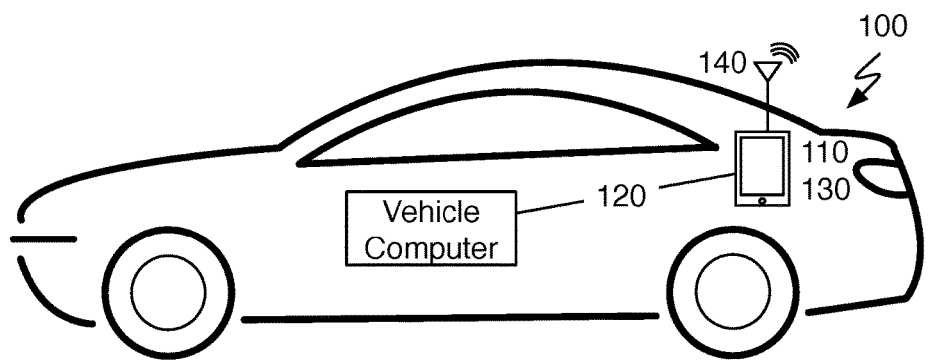
FIG. 1 is a diagram representation of a system of a preferred embodiment.

As shown in FIG. 1, a system 100 for externally interfacing with an autonomous vehicle includes an external input interface 110 and a local communications interface 120. The system 100 may additionally include an external display interface 130 and/or a remote communications interface 140. The system 100 functions to provide an interface external to an autonomous vehicle which can be used to interact and/or otherwise, control one or more operations of the autonomous vehicle. Accordingly, the system 100 functions to enable a person exterior to the autonomous vehicle to interact with the autonomous vehicle in some manner; for example, to request that an autonomous vehicle move itself or provide access to a cargo area.

The system 100 is preferably implemented as part of (or is otherwise operatively coupled to or physically linked in some manner to) an autonomous vehicle. In this manner, an operational connection for controlling the autonomous vehicle may be easily established or pre-established between an onboard computer or other controller of the autonomous vehicle and the system 100.

Alternatively, the system 100 or parts thereof may be implemented independent or separate from the autonomous vehicle, but during a controlling of or interaction with the autonomous vehicle an operational connection between the system 100 and the autonomous vehicle may be established via a physical or wireless connection.

The autonomous vehicle is preferably a fully autonomous automobile, but may additionally or alternatively be any semi-autonomous or fully autonomous vehicle; e.g., a boat, an unmanned aerial vehicle, a driverless car, etc. Additionally, and/or alternatively, the autonomous vehicle may be a vehicle that can be both fully autonomous or semi-autonomous depending on one or more scenarios. In the semi-autonomous configuration, the vehicle requires some level of input from a human user for performing one or more operations thereof.

Figure 7:
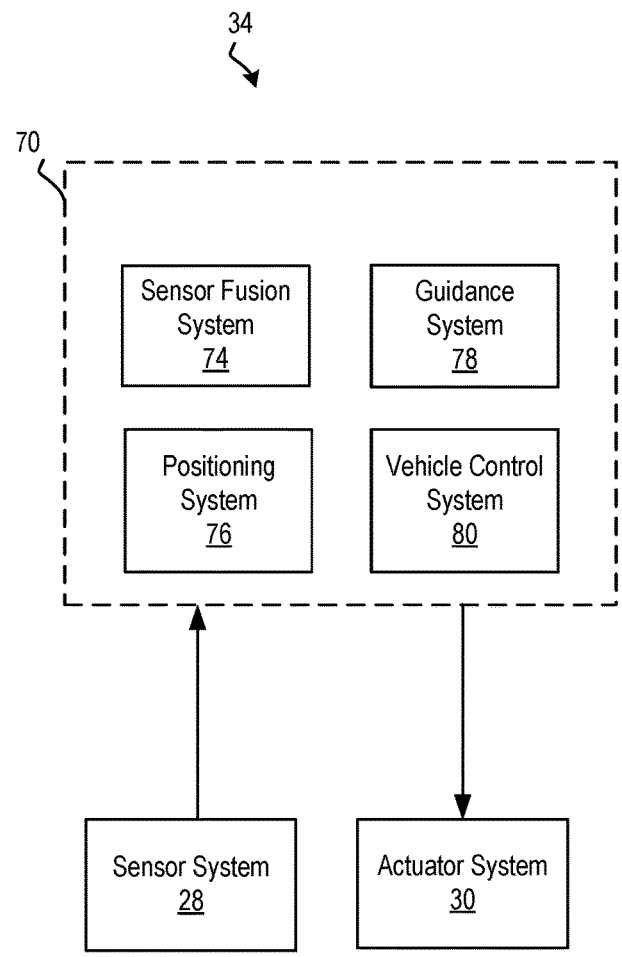
FIG. 7 is a diagram representation of a system of a preferred embodiment.

In accordance with various embodiments, controller 34 implements an autonomous driving system (ADS) 70 as shown in FIG. 7. That is, suitable software and/or hardware components of controller 34 (e.g., processor 44 and computer-readable storage device 46) are utilized to provide an autonomous driving system 70 that is used in conjunction with vehicle 110.

In various embodiments, the instructions of the autonomous driving system 70 may be organized by function or system. For example, as shown in FIG. 7, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 110. In various embodiments, the sensor fusion system 74 can incorporate information from multiple sensors, including but not limited to cameras, LIDARS, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 110 relative to the environment. The guidance system 78 processes sensor data along with other data to determine a path for the vehicle 110 to follow. The vehicle control system 80 generates control signals for controlling the vehicle 110 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

In addition to a powertrain (or other movement-enabling mechanism), the autonomous vehicle preferably includes an onboard computer and a sensor suite (e.g., computer vision system, LIDAR, RADAR, wheel speed sensors, GPS, cameras, etc.). The onboard computer functions to control the autonomous vehicle and processes sensed data from the sensor suite and/or other sensors in order to determine the state of the autonomous vehicle. Based upon the vehicle state and programmed instructions, the onboard computer preferably modifies or controls behavior of the autonomous vehicle.

The onboard computer is preferably a general-purpose computer adapted for I/O communication with vehicle control systems and sensor systems, but may additionally or alternatively be any suitable computing device.

The onboard computer is preferably connected to the Internet via a wireless connection (e.g., via a cellular data connection) or other long-range communication network or system. Additionally, or alternatively, the onboard computer may be coupled to any number of wireless or wired communication systems and may communicate via any known communications systems including short-range communication systems (e.g., radio frequency or Bluetooth, etc.) and mesh networks (e.g., formed by a plurality of autonomous vehicles or the like).

The onboard computer is preferably able to connect to networks independently of the remote communications interface 140, but may additionally or alternatively connect to networks only through the remote communications interface 140.

The external input interface 110 functions to enable a person or other entity exterior to the autonomous vehicle to control, communicate, and/or interact with the autonomous vehicle. The entity is preferably a human user, but additionally and/or alternatively, the entity may be another autonomous vehicle, a non-human user, or other device capable of interacting with the external interface of the autonomous vehicle. For instance, the entity may be an autonomous device or semi-autonomous device. In one example, the entity may be an autonomous device such as a parking meter that desires to communicate with the autonomous vehicle. In such example, the parking meter may interact with the external interface of the autonomous vehicle to request that the autonomous vehicle move or provide additional funds for using a parking space associated with the parking meter.

The external input interface 110 preferably includes one or more input devices located at or otherwise coupled to the exterior of the vehicle, but may additionally or alternatively include any input devices accessible to a person outside of the vehicle (e.g., a camera located inside a vehicle cabin, but imaging the outside of the vehicle through a window).

Input devices of the interface 110 may include input devices of any modality; e.g., visual (e.g., a camera, a biometric scanner such as a fingerprint scanner, an IR photodetector), audio (e.g., a microphone or other audio sensor), mechanical motion (e.g., a joystick, a button, a touchpad, a set of switches, a pressure sensor, touch-sensitive display), a mobile device (e.g., a mobile phone), and electrical (e.g., an RFID reader).

Additionally, or alternatively to input devices as described here, the external interface 110 may receive input (e.g., instructions transmitted over Wi-Fi Internet routing or cellular Internet) from the remote communications interface 140 or through the autonomous vehicle (e.g., via a remote communications interface of the vehicle, that interface independent of the interface 140.

The external input interface 110 preferably includes a mechanism (e.g., proximity sensors or one or more input devices) for verifying proximity and/or identity of a person or other entity (e.g., an ambulance) interacting with the interface 110. This is primarily important if the external interface 110 receives or is able to receive instructions from a remote communication source (e.g., over the Internet or otherwise from a device not close or connected to the vehicle). Additionally, or alternatively, this function may be performed by the autonomous vehicle (or may not be performed at all).

Additionally or alternatively, the external input interface 110 may be activated based on a proximity of an entity to the external input interface 110 and/or the autonomous vehicle. In such embodiment, the external input interface 110 using proximity sensors or other sensors (e.g., a camera, line-of-sight detectors, or the like) can determine a proximity of an entity to the external input interface 110 and/or to the autonomous vehicle and automatically activate one or more operations and/or functionalities of the external input interface 110 to prepare for interacting with the user. For instance, while the external input interface 110 is not engaged in an interaction, the external input interface 110 may operate in a dormant state in which it operates on a limited amount of power but operates lower power consuming functionality (e.g., dormant functionality), such as those required to receive signals and other critical information regarding the autonomous vehicle and the like (e.g., signals from one or more proximity sensors). However, upon receiving a proximity signal or the like indicating that an entity is within or is operating within a predetermined proximity of the user, the external input interface 110 may begin to operate in an awakened state. In the awakened state, additional functionalities of the external input interface 110 become active and can be used by the entity to interact with the autonomous vehicle. For example, in the awakened state of an external input interface, the functionality of a display may become active such that the display lights up from a darkened state and functionality of the display also becomes active so that an entity can selectably use one or more input elements including one or more selectable digital input buttons made available by the display.

Preferably, when verifying proximity of a person or entity, the system 100 may identify a location of the person or entity relative to the autonomous vehicle or the like. The location of the person or entity may be determined in any manner including using one or more sensors (e.g., cameras, ultrasound, line-of-sight detectors, depth sensors, etc.) available to the autonomous vehicle. Once the system 100 has identified the location of the person or entity, the system 100 determines whether the person or entity is in a predetermined proximity of the autonomous vehicle. In some embodiments, a person or entity must be in a vicinity or in close proximity (e.g., near) of the autonomous vehicle to externally operate the autonomous vehicle using the external input interface 110. The predetermined proximity may be a distance range (e.g., 0-2 feet, etc.) in which a person or entity is sufficiently close to the autonomous vehicle for controlling, interacting, and/or communicating with the vehicle externally. As mentioned above, in some embodiments, the system 100 is only activated when an entity is in sufficient or in a predetermined proximity of the autonomous vehicle or external input interface 110. The system 100 would compare the location of the entity (e.g., the distance away of the entity) to the predetermined proximity range or threshold and in the case, the person or entity is determined to be within the predetermined proximity and optionally, authorized and/or authenticated, the autonomous vehicle would allow or enable control, communication, and/or interaction using the external input interface 110.

Additionally, or alternatively, the system 100 may determine that an entity is within sufficient proximity when the entity is within a line-of-sight of the autonomous vehicle or the external interface 110 of the autonomous vehicle. In this way, the autonomous vehicle can readily implement physical authentication measures to ensure that the entity is authorized to interact and/or control the autonomous vehicle.

The external input interface 110 is preferably coupled to the onboard computer of the autonomous vehicle and may be capable (e.g., given proper authorization) of controlling functions of the autonomous vehicle through the onboard computer. For example, the external input interface 110 may send instructions to the onboard computer or otherwise, to move the autonomous vehicle from a first location to a second location, etc.

The external input interface 110 likewise may be capable of accessing sensors coupled to the autonomous vehicle for obtaining historical or present information about the autonomous vehicle and/or the autonomous vehicle's surrounding. For example, the external input interface 110 may use cameras of the autonomous vehicle to aid in authenticating a user (e.g., a person or an entity). In another example, an officer or medical personal may use the cameras of the autonomous vehicle to determine a cause of an accident or simply to identify past occurrences visible through the cameras of the autonomous vehicle.

The external input interface 110 is preferably coupled to the onboard computer of the autonomous vehicle via the local communications interface 120. The external interface 110 may additionally or alternatively be coupled to the onboard computer in any manner; for example, the interface 110 may couple to the onboard computer through the Internet (e.g., from the external interface 110 to the remote communications interface 140), physical wiring, short-range wireless communication systems (e.g., Blue tooth), and/or any other communications interface available to the autonomous vehicle including a communications interface of another autonomous vehicle.

In a variation of a preferred embodiment, the external input interface 110 is not coupled to the onboard computer of the autonomous vehicle at all. In this variation, the external input interface 110 may be coupled to actuators of the autonomous vehicle directly; for example, the external input interface 110 may be coupled to a latch on the trunk of the autonomous vehicle, allowing the external interface 110 to open the trunk without directly communicating with the onboard computer of the autonomous vehicle. As another example, the external input interface 110 may allow a user to contact a person authorized (e.g., a remote human expert) to control or access the car (potentially from a remote location) without using any functional components of the autonomous vehicle; in this example, the external input interface 110 may not directly interact with any sensors or actuators of the autonomous vehicle.

In a first example, the external input interface 110 includes a touchscreen on the exterior of the autonomous vehicle. This touchscreen (a touch or pressure-sensitive display panel) could be used for a number of functions, including: requesting that the autonomous vehicle move (e.g., from one parking space to another), authenticating a touchscreen user (e.g., allowing access to vehicle functions, to the interior of the vehicle, to an external cargo area of the vehicle), contacting a person associated with the vehicle (e.g., a remote expert that may move the vehicle or an owner of the car, to let them know the car is parked illegally or improperly), contacting authorities (e.g., reporting a crime), pairing another electronic device with the vehicle (e.g., enabling a smartphone possessed by a user to control functions or access to the vehicle).

Figure 2:
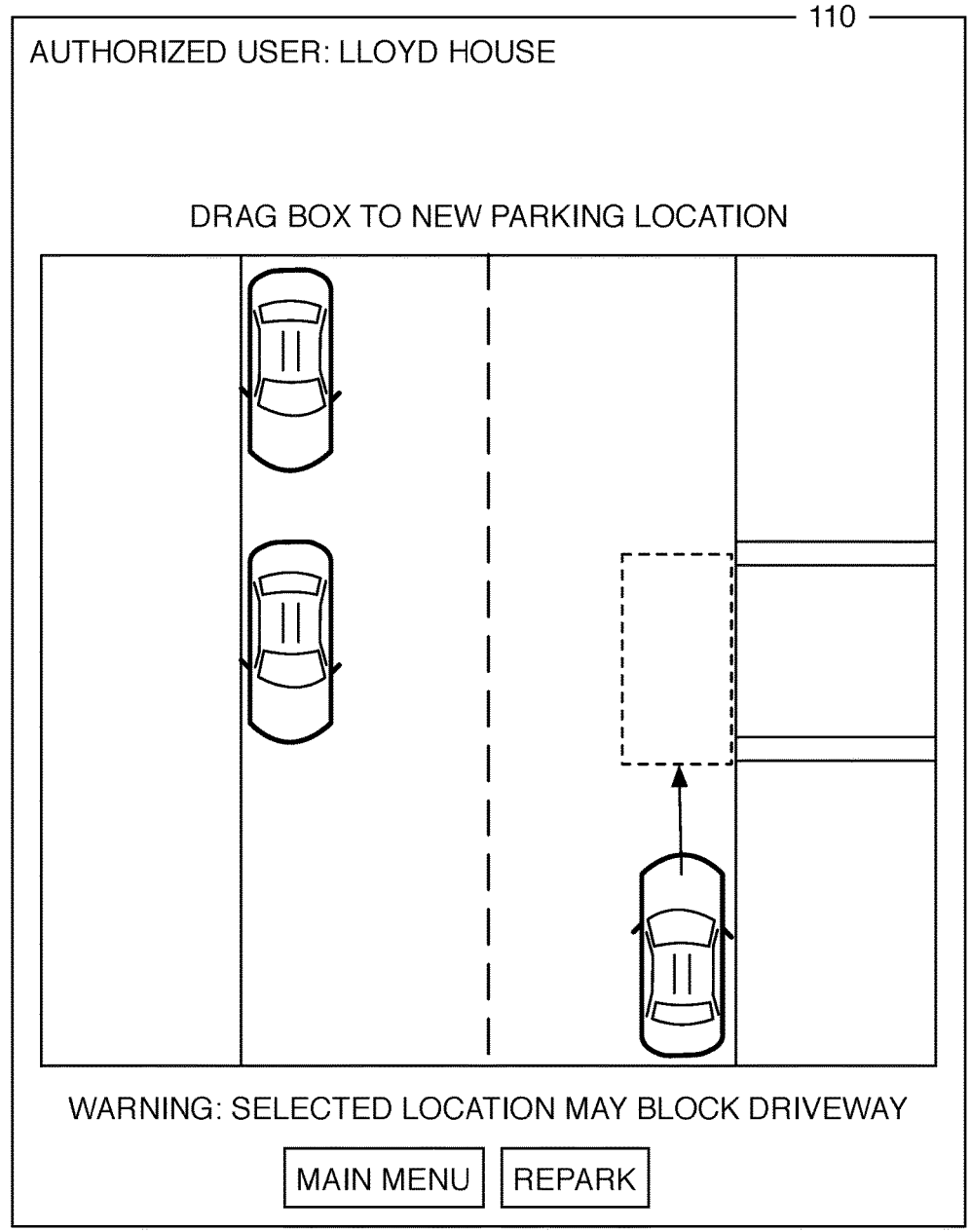
FIG. 2 is an example view representation of an external input interface of a system of a preferred embodiment.

As shown in FIG. 2, an authorized user could potentially see a top-down view of the vehicle in the current location and direct that vehicle to move (e.g., to re-park). For instance, an authorized user may be able to drawn on the touchscreen using a finger or other input device a line from the autonomous vehicle to a new location which corresponds to a termination point of the line. Alternatively, an authorized user may simply select a new location to which the autonomously vehicle should move to by pointing onto the touchscreen to the new location, which may be optionally displayed on an area map or the like. Additionally, and/or alternatively, the user may be able to verbally or using gestures indicate where the autonomous vehicle is required to move or relocate to.

Figure 3:
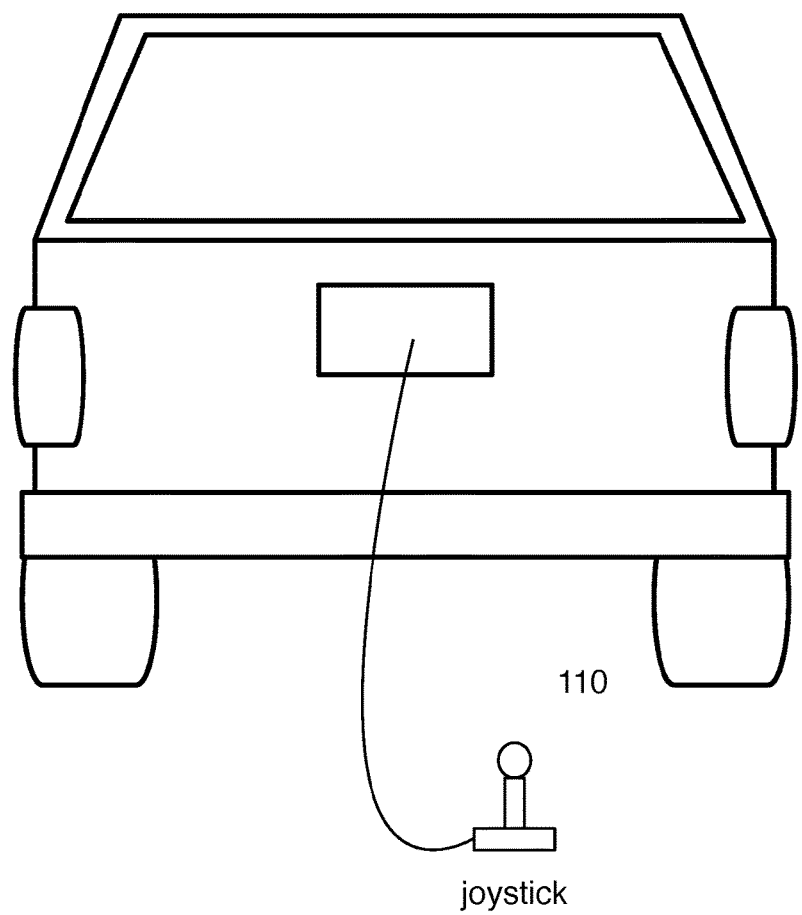
FIG. 3 is an example view representation of an external input interface of a system of a preferred embodiment.

In a second example, the external input interface 110 includes a joystick or other controller (e.g., a gamepad, a trackball) mounted to or otherwise coupled to the autonomous vehicle. In a variation, the controller may be wirelessly connected to the autonomous vehicle. For example, as shown in FIG. 3, the external input interface 110 includes a joystick communicatively coupled to the external input interface 110 (and the vehicle) by a wire. In this example, the controller may be stored in a latched box or other storage space accessible on the exterior of the vehicle or an authorized entity may bring the controller to the vehicle; authorization or authentication of a user may result in physical access to the controller. Alternatively, the controller may be physically accessible without authentication (e.g., a joystick is mounted to the bumper of a vehicle), but may not be able to control the vehicle without authentication (e.g., moving the joystick does nothing until after authentication, after which point moving the joystick moves the vehicle). The controller may be coupled to the interface 110 in any manner, including wirelessly or using wires. In a variation of this example, the interface 110 may include an access port or cable that is secured (e.g., in a latched box) until authentication, after authentication the user may plug a mechanical controller (e.g., a gamepad) or other device capable of serving as a controller (e.g., a smartphone) into the access port or cable to control the vehicle.

Figure 4:
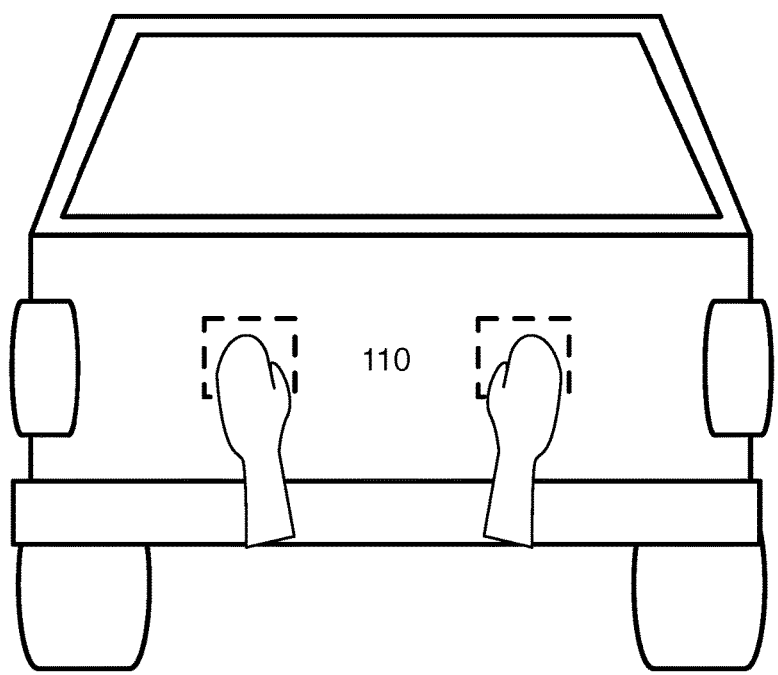
FIG. 4 is an example view representation of an external input interface of a system of a preferred embodiment.

In a third example, the interface 110 includes two touchpads (or pressure sensitive pads/areas, mechanical switches, etc.) placed on a surface of the autonomous vehicle, as shown in FIG. 4. By pushing on the pads (preferably after authentication) a user may control one or more operations of the vehicle including being able to move the vehicle in the direction of pad actuation; for example, pressing on both pads may result in forward movement, while pressing on the left pad only may result in a left-turn motion; etc. Alternatively, the touchpads (or pressure sensitive pads/areas, mechanical switches, etc.) may control vehicle motion in any manner given a predetermined combination of inputs to the touchpad interface. Thus, the two touchpads may be configured in accordance with a predetermined touch control combination system in which various combinations provided to the two touch pads activates and/or operates different features of the autonomous vehicle. It shall be noted that while in the above examples the autonomous vehicle has two touchpads, it is impossible to implement in any number (e.g., more than two touchpads or a single touchpad) of touchpads for interacting and/or controlling the autonomous vehicle.

In a variation of this example, the pads may include a biometric authentication system (e.g., handprint/fingerprint scanners embedded in the pods) and/or a display (e.g., linked to a camera on an opposite side of the vehicle, allowing the user to 'see through' the vehicle). Thus, during or prior to an interaction and/or an operation of the autonomous vehicle, the pads may automatically begin an authentication process of the entity. In some instances, the autonomous vehicle may provide provisional access or control of the autonomous vehicle and after successful authentication, the access and/or controls of the autonomous vehicle provided to the entity may be enhanced to include additional and/or unrestricted access or control of the autonomous vehicle.

In a fourth example, the external input interface 110 includes an emergency vehicle detector (e.g., a traffic pre-emption detection device). Traffic pre-emption detection devices are devices communicatively coupled to traffic lights to enable detection of emergency vehicles and to manipulate the traffic signal timing to enable those vehicles to move quickly through traffic signals in cases of emergency. Some examples of traffic pre-emption detection devices include acoustic detectors (e.g., detectors that detect a particular siren sound, such as those associated with emergency vehicles and the like), line-of-sight detectors (e.g., an infrared receiver that detects a particular infrared light flashing pattern or frequency), and localized radio signal detectors (e.g., an RF receiver that detects a particular signal). In this example, the external input interface 110 may alternatively detect emergency vehicles (or other vehicles with authority over the autonomous vehicle) in any manner. In response to detection of an emergency vehicle, the interface 110 may, for example, enable access to an input device of the interface 110 and/or perform an automatic action (e.g., moving the autonomous vehicle out of the way of an emergency vehicle).

In a fifth example, the external input interface 110 may include a camera, a microphone, and some mechanism for detecting a person desiring interaction with the external input interface 110 (e.g., a button that a person may press, or using face detection algorithms operable on the camera image). In this example, a person may use the external input interface 110 to request assistance or otherwise communicate with another person (or an automated assistant). For example, a person may initiate a video call with a remote expert (e.g., who may move the car remotely), with a vehicle owner or operator, or with any other person (e.g., with an emergency services operator).

In a sixth example, the external input interface 110 may include a motion sensor (e.g., an accelerometer coupled to the vehicle) or may be coupled to a motion sensor of the autonomous vehicle (directly or indirectly; e.g., through the onboard computer). In this example, the interface 110 may function to detect a person or object contacting the vehicle (e.g., a parallel parked car keeps hitting the autonomous vehicle while trying to exit a parking space); after which point a response to the detection may be performed by the system 100 or by the autonomous vehicle.

Additionally, and/or alternatively, the external interface 110 may include a gesture recognition system including a gesture sensor and gesture database which may be optionally coupled to the motion sensor. The gesture recognition sensor may be able to recognize gestures from an entity as a means for interacting with the autonomous vehicle. For instance, the gesture recognition sensor may be able to recognize sign language or other, gestures specifically intended for controlling an operation of the autonomous vehicle. The gesture recognition sensor, in such instance, would capture the gestures of an entity using a camera or other device capable of interpreting the gestures.

In a seventh example, the external input interface 110 may include a credit card reader (or other identification/token reader; e.g., RFID, NFC, etc.). In this example, the external input interface 110 may function to authorize (e.g., via charging a credit card, or identifying an authorized person) access to autonomous vehicle functions and/or storage space coupled to the autonomous vehicle. Additionally, or alternatively, the external input interface 110 may include a payment interface in which an entity can use any recognized or known form of payment to the autonomous vehicle in exchange for one or more operations and/or services to be provided by the autonomous vehicle. Such payment interface would be able to accept physical bills and credits cards, as well as electronic fund transfer and/or payments.

In an eighth example, the external input interface 110 may be coupled to or include a tracked controller that may be used by an entity to move the autonomous vehicle to a new location. Specifically, the tracked controller may be any type of portable trackable device (e.g., a mobile computing device, mobile phone, etc.) including any device having a global positioning system (GPS) or locator system that can be moved to a location which the autonomous vehicle will attempt to follow. For instance, the tracked controller may include a GPS which periodically sends out a signal to the autonomous vehicle providing its geographic location (e.g., x, y, z coordinates). In another example, the tracked controller may continuously or periodically emit a beacon or a signal which can be used by the autonomous vehicle to locate the tracked controller. In such example, the beacon from the tracked controller may be received by the autonomous vehicle and using one or more positioning or tracking computations, the autonomous vehicle is able to determine an origin of the beacon.

Figure 6:
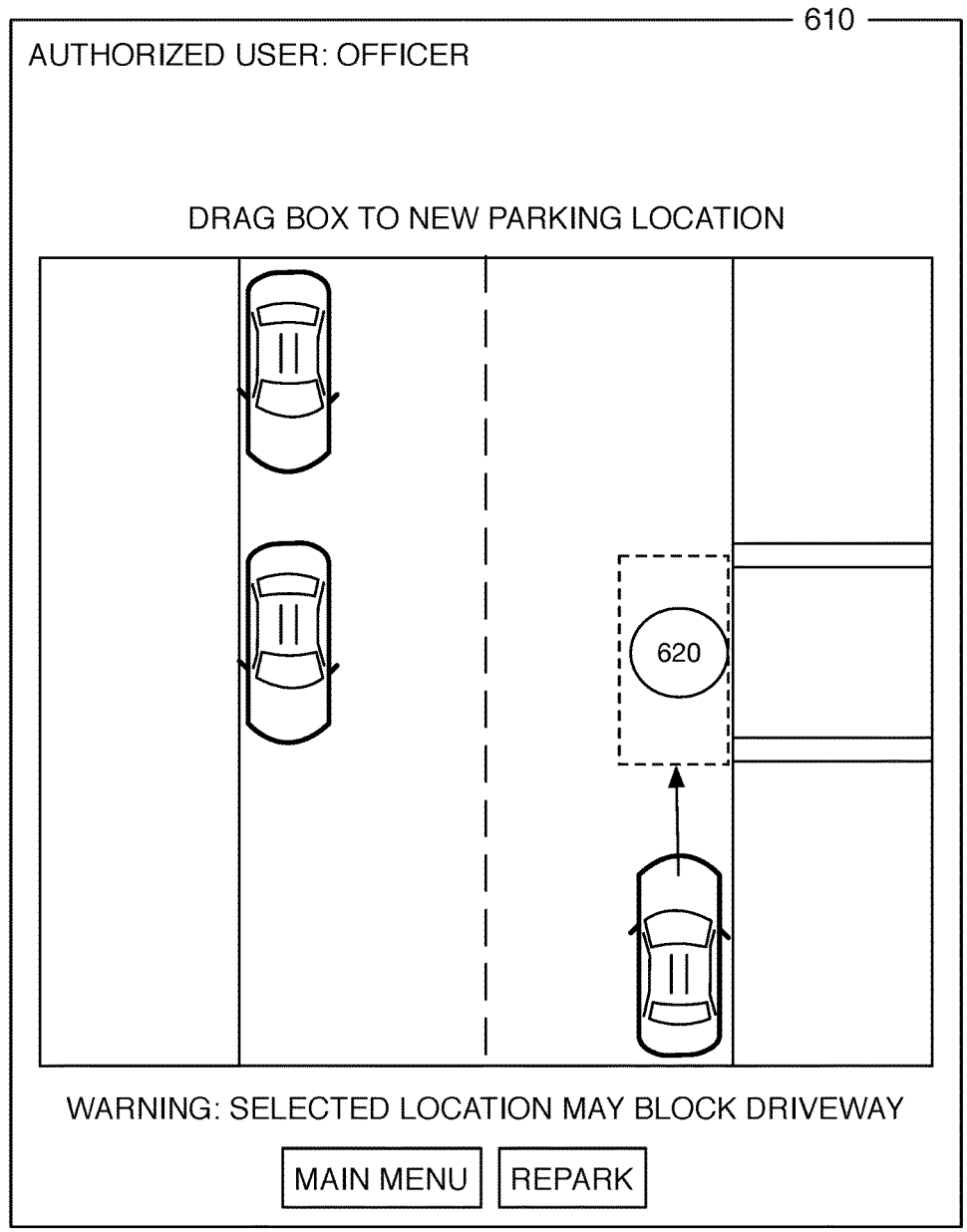
FIG. 6 illustrates a diagram representation of a system of a preferred embodiment.

In this example, an entity may use the tracked controller to move the vehicle from a first location to a second location. As shown in FIG. 6, the tracked controller 620 may be moved into a new location and once the tracked controller is either physically placed down into the new location or otherwise, a new location is confirmed with the tracked controller 620, the autonomous vehicle will move to the physical placement of the tracked controller 620 or move to the new location that was confirmed by the tracked controller 620. In the instance that the autonomous vehicle receives a confirmed location, the autonomous vehicle will move to be over or adjacent the confirmed new location. In the instance that the autonomous vehicle follows or tracks the physical placement of the tracked controller 620, the autonomous vehicle will move to be over or adjacent the physical placement of the controller. Whether the autonomous vehicle travels to be over or next to the confirmed location or physical location of the tracked controller 620 can be determined by the entity with the tracked controller.

In the above examples, a level of control or interaction provided to the entity attempting to interface with the autonomous vehicle often depends on authentication and/or authorization parameters associated with the specific entity attempting to interface with the autonomous vehicle. The level of control or interaction allowed with the autonomous vehicle may be represented as a control spectrum in which there can be zero to low control of the autonomous vehicle provided to the entity all the way through full control of the autonomous control provided to the entity. As mentioned above, the level of control afforded an entity depends mainly on the authentication and/or authorization parameters associated with the entity and thus, during the authentication and/or authorization process, the autonomous vehicle will associate or correspond the authentication and/or authorization parameters of the entity to at least one control level of the predetermined control spectrum. In this way, once the control level is identified, the autonomous vehicle may either increase or decrease interaction restrictions of the entity.

The local communications interface 120 functions to couple the external input interface 110 to the autonomous vehicle. The local communications interface 120 preferably couples the external input interface 110 to an onboard computer of the autonomous vehicle, but may additionally or alternatively couple the external input interface 110 to the autonomous vehicle in any manner (e.g., coupling the external input interface 110 to individual sensors and/or actuators of the autonomous vehicle directly).

In one variation of a preferred embodiment, the external input interface 110 is not locally communicatively coupled to any part of the autonomous vehicle (the interface 110 may or may not be remotely coupled to the autonomous vehicle; e.g., through the Internet); in this variation, the system 100 may not include the local communications interface 120.

The local communications interface 120 may be any suitable communications interface; e.g., a wired electrical interface, a wireless communication interface (e.g., Bluetooth, Wi-Fi, near-field communication (NFC)), an optical communication interface (e.g., fiber-based, free-space), etc.

The external display interface 130 functions to provide visual feedback to a person or other entity in proximity of the autonomous vehicle. For example, the external display interface may be a touchscreen providing an interface as shown in FIG. 2. The external display interface 130 may include any visual display (e.g., LCD, OLED, LED matrix, e-ink) visible or accessible to an entity exterior to the autonomous vehicle.

The system 100 may additionally or alternatively include any other type of output device (e.g., a speaker, an infrared strobe, a programmable braille reader, etc.) for providing feedback to a person or other entity in proximity of the autonomous vehicle.

The remote communications interface 140 functions to enable communication of the system 100 with an electronic device other than the autonomous vehicle. The remote communications interface 140 preferably communicatively couples the system 100 to the Internet, but may additionally or alternatively couple the system 100 to any other device. The remote communications interface 140 preferably communicates over a cellular internet connection, but may additionally or alternatively communicate over any type of wireless connection (e.g., Wi-Fi, Bluetooth, line-of-sight microwave, satellite). The remote communications interface 140 is preferably included in the system 100 if the system 100 requires or desires a connection to the Internet independent of operation of the autonomous vehicle, but the remote communications interface 140 may alternatively be included in the system 100 for any reason.

Processing required to perform duties of the system 100 may be performed using dedicated processors (i.e., processors dedicated to and included in the system 100) and/or any processors of the autonomous vehicle (e.g., the onboard computer, microcontrollers, etc.). Likewise, any other resources required for system 100 duties may be provided by dedicated resources (e.g., a battery dedicated to the system 100) and/or by resources of the autonomous vehicle (e.g., a primary battery of the autonomous vehicle).

2. Method for Externally Interfacing with an Autonomous Vehicle

Figure 5:
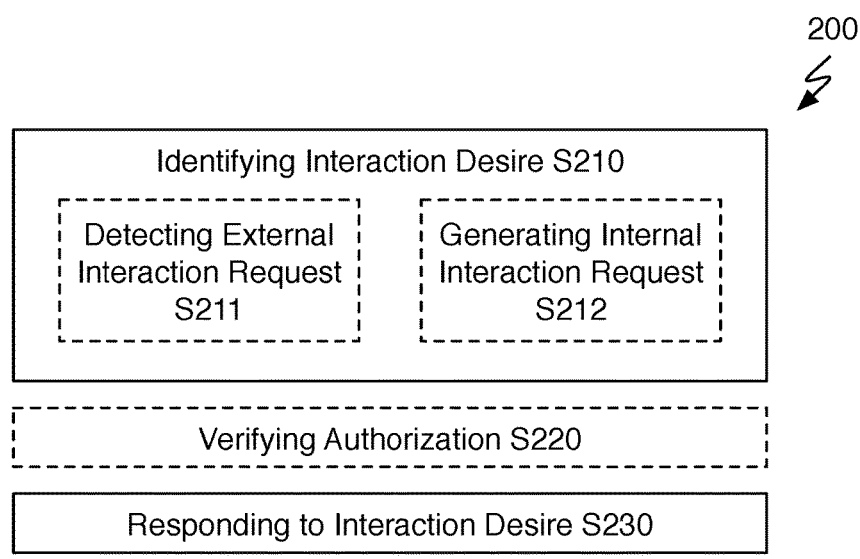
FIG. 5 is a chart representation of a method of a preferred embodiment.

As shown in FIG. 5, a method 200 for externally interfacing with an autonomous vehicle includes identifying an interaction desire S210 and responding to the interaction desire S230. The method 200 may additionally include verifying authorization and/or authentication S220.

The method 200 is preferably implemented by the system 100, but may additionally or alternatively be implemented natively by an autonomous vehicle and/or by any system capable of interfacing with an autonomous vehicle.

Identifying an interaction desire S210 functions to identify a desire or need for interaction between the autonomous vehicle and the environment external to the autonomous vehicle. Interactions between the autonomous vehicle and the external environment preferably include interactions between persons or other entities (e.g., vehicles, robots, animals) proximal to the vehicle and the autonomous vehicle, but may additionally or alternatively include interactions with the autonomous vehicle and any aspect of the environment (e.g., changing weather conditions around the autonomous vehicle).

S210 preferably includes at least one of detecting an external interaction request S211 and generating an internal interaction request S212. External interaction requests are preferably detected when a person or entity external to the autonomous vehicle expresses (e.g., through an input mechanism, by moving near the autonomous vehicle) an explicit or implicit desire to interact with the autonomous vehicle. Internal interaction requests are preferably generated when the autonomous vehicle decides that interaction with the external environment is desirable despite not detecting a desire for interaction from another entity; for example, the autonomous vehicle may generate an internal interaction request if sensors detect flooding (or communications links receive reports of flooding) near the autonomous vehicle.

Detecting an external interaction request S211 functions to detect an interaction request from a person or other entity external to the autonomous vehicle. As previously mentioned, interaction requests may be explicit (i.e., the entity performs an action with clear intent to interact with the autonomous vehicle) or implicit (i.e., an action or state of the entity is inferred as a desire to interact with the autonomous vehicle, potentially regardless of intention). The inference of a desire to interact may be based on one of or a combination of factors including one or more actions of a person or entity, contextual information about circumstances around the autonomous vehicle, and data being sensed and/or provided to the autonomous vehicle.

S211 may include detecting an interaction request in any manner; for example, by detecting presence of an entity with a camera of the autonomous vehicle, by detecting actuation of a touch sensor, button, or switch external to the vehicle, by receiving an electronic transmission from an entity external to the vehicle, by detecting voice commands from an entity external to the vehicle, by detecting proximity of an entity using ultrasound sensors, or in any other manner. Additional examples of detecting interaction requests may be found in the sections on the system 100; any interaction with the external input interface 110 may potentially result in detection of an interaction request.

Generating an internal interaction request S212 functions to enable the autonomous vehicle (or a connected device) to make an internal decision that interaction between the autonomous vehicle and the environment is desirable. S212 preferably includes monitoring sensors of the autonomous vehicle and/or communications channels of the autonomous vehicle to detect scenarios in which interaction between the autonomous vehicle and the environment is desired. For example, S212 may include monitoring cameras, intrusion sensors, motion sensors, pressure sensors, accelerometers, etc. for signs of attempted unauthorized access to the vehicle. As another example, S212 may include monitoring sensors and/or communications links to detect environmental hazards to the autonomous vehicle (e.g., inclement weather, fires, electrical hazards, earthquakes, etc.). As a third example, S212 may include monitoring sensors of the autonomous vehicle to detect when interaction is desirable due to an internal state of the autonomous vehicle (i.e., not solely due to some condition of the external environment); e.g., S212 may include detecting that the autonomous vehicle needs maintenance, that the vehicle has been collided with, that a battery of the autonomous vehicle needs recharging, or that a fuel tank of the autonomous vehicle needs refilling. As a fourth example, S212 may include monitoring sensors of the autonomous vehicle to detect when interaction with the external environment is desirable for any other reason; e.g., detecting that a person inside the autonomous vehicle needs medical assistance.

The interaction request generated or detected in S210 preferably includes an associated interaction desire. This interaction desire specifies the type of interaction requested (and may include additional data about the interaction, the entity desiring interaction, and/or the circumstances leading to interaction request detection or generation). If not explicitly specified (e.g., by user selection, by electronic transmission), this interaction desire is preferably inferred from the interaction request; for example, it may be inferred that an entity touching a touchscreen coupled to the autonomous vehicle may desire to view or interact with information on the touchscreen. Likewise, it may be inferred that an entity actuating a joystick coupled to the autonomous vehicle may desire to move the autonomous vehicle, or that an entity swiping a credit card coupled to a latched storage space attached to the vehicle is attempting to access the storage space.

For an internally generated interaction request, the associated interaction desire is preferably specified according to rules of request generation; for example, detecting that a storm is approaching the vehicle may result in a request to move the vehicle into a covered garage according to programming of the autonomous vehicle.

Note that in many cases, the interaction desire/response process is iterative. For example, an entity touches a touchscreen (desire to interact with touchscreen); the touchscreen wakes up (response to desire); the entity enters a passcode (desire to access touchscreen menu); passcode verified and menu displayed (response to desire); the entity presses a menu item corresponding to opening a car door (desire to open car door); the car door opens (response to desire).

Verifying authorization S220 functions to verify that an entity is authorized to request an interaction response and/or that the autonomous vehicle is authorized to perform the interaction response. S220 preferably functions to authorize interaction responses in situations where the interaction desire is not explicitly a desire for authorization or authentication. For example, entering a passcode into a touchscreen demonstrates a clear desire to authorize (e.g., authorize the entity to gain access to a touchscreen menu).

However, if an entity approaches a vehicle and attempts to move the vehicle using a joystick located at the vehicle bumper, the interaction desire may be interpreted as a desire to move the vehicle (and not necessarily as a desire to authenticate first).

Nevertheless, in such situations, it may be desired to verify that an entity is authorized to request some interaction response (or any interaction response).

If authorization for a particular interaction response is limited (e.g., not available for all entities), S220 preferably includes authenticating the requesting entity. Authentication of an entity may be performed in any manner; e.g., via facial recognition using a camera of the autonomous vehicle, via detection of an electronic device linked to an authorized entity, via transmission from an electronic device such as a digitally signed message or an electronic code, via voice recognition, via fingerprint recognition, etc.

Authentication is preferably performed in the background (i.e., without specifically requesting an entity to participate in authentication) but may additionally or alternatively be performed by explicitly requesting the entity to authenticate (e.g., telling the entity "swipe your ID card" or "state your name" or "enter your identification code").

In one implementation of a preferred embodiment, authentication is performed by contacting another entity; for example, authentication may be performed by calling the vehicle owner and asking the vehicle owner if the entity is a recognized individual (e.g., including displaying a picture of the entity). As another example, authentication may be performed by calling a remote expert and requesting the remote expert to authenticate an individual (as described in U.S. patent application Ser. No. 15/398,562 named System and Method for Remotely Assisting Autonomous Vehicle Operation, filed on 4 Jan. 2017, and U.S. Provisional Patent Application No. 62/274,577, filed on 4 Jan. 2016, the entireties of which are incorporated by this reference). Note that authentication may simply mean authenticating an entity as one of a class of entities, not necessarily as an individual. For example, an entity may be authenticated as a human above a certain age (e.g., enabling the human to access potentially age-restricted material, like a survival knife).

In a related implemented of the preferred embodiment, authentication may be performed based on a presence of computer-detectable and/or computer-readable device being in proximity of the autonomous vehicle or external interface. In one example, emergency response personnel may be provided with a badge or another element that is detectable and/or readable by the autonomous vehicle. The autonomous vehicle may be able to detect and read the badge in order to identify the entity hosting the badge as either an authorized and/or authenticated entity. The detectable badge may also identify or point the autonomous vehicle to the one or more privileges, access, and/or control rights associated with the specific detectable badge.

After authentication has been performed (or if authentication is not necessary for authorization), S220 preferably includes verifying authorization for an interaction response. Authorization may be linked to authentication (e.g., particular entities have authorization to request certain responses, other entities may be explicitly barred from requesting certain responses), but may additionally or alternatively be linked to any other factor. For example, authorization to move a vehicle may only be granted during certain hours of the day. As another example, authorization may be performed by calling a remote expert and requesting the remote expert to authorize some action; for example, a person may explain that he or she is in need of medical assistance, and the remote expert may authorize the person to access a first aid kit based on the requestor's explanation.

Responding to the interaction desire S230 functions to enable the autonomous vehicle to perform some action in response to an identified interaction desire. S230 may include producing multiple responses to an interaction desire. For example, an unauthorized user attempting to access a touchscreen may be notified that access is denied (response #1); additionally, the vehicle owner may be notified of a denied access attempt (response #2).

S230 may include responding to interaction desires subject to a set of constraints. For example, if it is desired the move a vehicle using a joystick, S230 may include moving the vehicle responsive to joystick movement, but only within a set of constraints. For example, S230 may set a maximum speed of the vehicle. As another example, S230 may not allow the vehicle to move within a threshold distance of a foreign object (e.g., as detected by ultrasound or other sensors of the vehicle) regardless of joystick input.

S230 may additionally or alternatively include responding to interaction desires based on authentication and/or authorization results (or not responding at all). For example, if an entity attempts to access a cargo space of the vehicle and the entity is authorized, access may be granted in S230. As another example, if an entity attempts to access a cargo space of the vehicle and the entity is not authorized, access may be denied (further, the vehicle owner and/or authorities may be notified automatically if repeated unauthorized access attempts are made).

Likewise, S230 may include modifying interaction response constraints based on authentication and/or authorization results. For example, a first entity may be able to move the vehicle (using the joystick) at a maximum speed of only 5 MPH, while a second entity may be able to move the vehicle of speeds of up to 15 MPH.

S230 may enable an appropriately authorized entity (either the requesting entity or another entity) to override some interaction response constraints; for example, an entity moving the vehicle with the joystick may be able to press a button on the joystick to override the maximum speed limit. As a second example, an entity attempting to re-park a car (as in FIG. 2) may be authorized to re-park the car only in certain approved areas; if an area is not approved, the entity may need to request an override from another entity (e.g., a remote expert, the vehicle owner, a police officer, etc.)

In one variation of a preferred embodiment, interaction responses may be restricted unless authorized by a local entity. For example, if a (presumably) authorized user requests, using a smartphone app, that the vehicle drives to pick up the entity, that request may require authorization by a local entity (e.g., a person who is near the vehicle and is also an authorized user). In this way, local authentication may serve as form of multi-factor authentication, preventing someone who illicitly gains access to a user's remote control app or remote control web interface to take control of the autonomous vehicle. Alternatively, interaction requests may trigger fraud detection algorithms; e.g., an algorithm may detect that an entity is requesting out-of-character interaction responses, and may lock or restrict actions on the vehicle pending review by a remote expert.

Requests may be responded to at any time. For example, interaction requests may be responded to immediately, or queued. Further, interaction responses may be executed according to any priority determining method; e.g., some responses may take precedence over others based on priorities set by the autonomous vehicle. Alternatively, responses may be executed in the order requested.

Many examples of interaction desire requests and responses are as described in previous sections. An additional example includes requesting that the autonomous vehicle follow or move toward an entity or a vehicle (e.g., follow that person, follow that car). The autonomous vehicle may execute this response in any manner; e.g., by tracking the entity/vehicle visually, by tracking an electronic device associated with the entity (e.g., tracking GPS of a smartphone), or in any other manner. In one variation, the autonomous vehicle tracks an individual whose smartphone emits a particular strobe pattern (e.g., via the camera flash).

The method of the preferred embodiment and variations thereof can be embodied and/or implemented at least in part as a machine configured to receive a computer-readable medium storing computer-readable instructions. The instructions are preferably executed by computer-executable components preferably integrated with a system for external interaction with autonomous vehicles. The computer-read-able medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for controlling an autonomous vehicle at an external interface, the autonomous vehicle having an external interface, an onboard computer processor, and a powertrain, the method comprising:
   at the external interface, operably in communication with the autonomous vehicle:
      allowing an entity in a proximity of an outside of the autonomous vehicle to interact with the external interface;
      receiving, from the entity, one or more control inputs; and
   controlling, based on control inputs from the entity, one or more operations of the autonomous vehicle based on the one or more control inputs received using the external interface,
   wherein the external interface comprises one or more pressure-sensitive areas positioned on an external surface of the autonomous vehicle, and wherein, based on an application of pressure to one or more sections of the one or more pressure-sensitive areas, the one or more pressure-sensitive areas control an operation of the autonomous vehicle for movement of the autonomous vehicle from a first location to a second location;
   wherein the entity comprises an operator disposed outside the autonomous vehicle;
   wherein the one or more pressure-sensitive areas comprise a touch screen on the external surface of the autonomous vehicle, the touch screen configured to receive operator instructions from the operator, by sensing the operator's physical engagement of the touch screen, including the operator's designation of the second location for the autonomous vehicle to be automatically moved to via the operator's engagement of the touch screen;
   wherein the step of receiving the one or more control inputs comprises receiving the operator instructions from the operator, including the operator's designation of the second location for the autonomous vehicle to be automatically moved to, via sensing of the operator's physical engagement of the touch screen on the external surface of the autonomous vehicle; and
   wherein the method further comprises implementing the operator instructions, via the computer processor disposed onboard the autonomous vehicle, by automatically, physically moving the autonomous vehicle, via computer instructions provided by the computer processor and implemented by the powertrain of the autonomous vehicle, to the second location as requested via the operator's physical engagement of the touch screen on the external surface of the autonomous vehicle.

2. The method of claim 1, wherein the external interface comprises an external digital control interface, disposed on the external surface of the vehicle, that is operable to control the autonomous vehicle via interactions with an onboard computer of the autonomous vehicle when the autonomous vehicle is incapable of establishing connectivity with one or more remotely located control data sources.

3. The method of claim 1, wherein the external interface comprises an external digital control interface, disposed on the external surface of the vehicle, that is operable to control the autonomous vehicle via interactions with an onboard computer of the autonomous vehicle when the autonomous vehicle identifies an assistance-desired scenario.

4. The method of claim 1, further comprising:
   authenticating an identity of the entity via the external interface, wherein the external interface is operably in communication with one or more sensors and/or input receiving devices configured to capture entity authentication data, wherein authenticating the entity includes processing the entity authentication data.

5. The method of claim 1, further comprising:
   authorizing a power to control the autonomous vehicle of the entity via the external interface, wherein the external interface is operably in communication with one or more sensors and/or input receiving devices configured to capture entity authorization data, wherein authorizing the entity includes processing the entity authorization data, and wherein the power authorized for the entity comprises a level of control provided to the entity for control of operations of the autonomous vehicle, the level of control for the entity selected from a plurality of different control levels in a predetermined control spectrum for the autonomous vehicle, based on the entity.

6. The method of claim 1, further comprising:
   verifying the proximity of the entity to the autonomous vehicle, wherein verifying the proximity includes:
      identifying a location of the entity,
      determining whether the location of the entity is within a predetermined proximity threshold required for the entity to control the autonomous vehicle via the external interface, wherein if the entity is within the predetermined proximity threshold, enabling the external interface to implement a process for controlling the autonomous vehicle using the external interface.

7. The method of claim 1, wherein:
   the operator draws a line on the touch screen from the autonomous vehicle to the second location, including a termination point of the line corresponding to the second location for automatic movement of the autonomous vehicle; and
   the step of receiving the control inputs comprises sensing a drawing of the line by the operator, including the termination point corresponding to the second location for automatic movement of the autonomous vehicle.

8. The method of claim 7, wherein the operator draws the line, including the termination point, directly on the touch screen via a finger or input device of the operator.

9. The method of claim 7, further comprising:
   displaying, on the touch screen, a top down view of the autonomous vehicle;
   wherein the operator draws the line, including the termination point, from the autonomous vehicle to the second location, using the top down view of the autonomous vehicle.

10. The method of claim 1,
    wherein the operator points to the second location on the touch screen.

11. The method of claim 10, further comprising:
displaying, on the touch screen, an area map of an area surrounding the autonomous vehicle;
wherein the operator points to the second location on the area map via the touch screen.

12. The method of claim 1, wherein the touch screen comprises two touchpads, wherein the entity's engagement of both of the touchpads results in forward movement of the autonomous vehicle, and wherein the entity's engagement of one of the touchpads without the other touchpad results in a turn for the autonomous vehicle.

13. An autonomous vehicle comprising:
a powertrain;
an external surface;
a pressure-sensitive touch screen disposed on the external surface;
an onboard computer processor disposed onboard the autonomous vehicle that includes a computer processor that controls one or more operations of the autonomous vehicle; and
a local communication interface that communicates data between the touch screen and the onboard computer processor of the autonomous vehicle;
wherein an operator that is external to and in proximity to the autonomous vehicle uses the touch screen to interact, via the local communication interface, with and control the autonomous vehicle;
wherein the touch screen comprises one or more sensors that are configured to receive operator instructions from the operator, by sensing the operator's physical engagement of the touch screen, including the operator's designation of the second location for the autonomous vehicle to be automatically moved to via the operator's engagement of the touch screen; and
wherein the onboard computer processor is configured to implement the operator instructions by providing computer instructions to the powertrain to automatically, physically move the autonomous vehicle to the second location as requested via the operator's physical engagement of the touch screen on the external surface of the autonomous vehicle.

14. The autonomous vehicle of claim 13, wherein:
the operator draws a line on the touch screen from the autonomous vehicle to the second location, including a termination point of the line corresponding to the second location for automatic movement of the autonomous vehicle; and
the touch screen senses a drawing of the line by the operator, including the termination point corresponding to the second location for automatic movement of the autonomous vehicle.

15. The autonomous vehicle of claim 14, wherein the operator draws the line, including the termination point, directly on the touch screen via a finger or input device of the operator.

16. The autonomous vehicle of claim 14, wherein:
the touch screen is configured to display a top down view of the autonomous vehicle; and
the operator draws the line, including the termination point, from the autonomous vehicle to the second location, using the top down view of the autonomous vehicle.

17. The autonomous vehicle of claim 13, wherein the operator points to the second location on the touch screen.

18. The autonomous vehicle of claim 17, wherein:
the touch screen is configured to display an area map of an area surrounding the autonomous vehicle; and
the operator points to the second location on the area map via the touch screen.

19. The autonomous vehicle of claim 13, wherein:
the touch screen comprises a first touchpad and a second touchpad positioned against the external surface of the autonomous vehicle, the first and second touchpads configured such that:
the autonomous vehicle will be automatically moved in a forward motion if both the first touchpad and the second touchpad are engaged by the operator; and
the autonomous vehicle will be automatically moved in a left turn motion if the first touchpad, but not the second touchpad, is engaged by the operator.

20. An autonomous vehicle comprising:
a powertrain;
an external surface;
a joystick disposed on the external surface;
an onboard computer processor disposed onboard the autonomous vehicle that includes a computer processor that controls one or more operations of the autonomous vehicle; and
a local communication interface that communicates data between the joystick and the onboard computer processor of the autonomous vehicle;
wherein an operator that is external to and in proximity to the autonomous vehicle uses the joystick to interact, via the local communication interface, with and control the autonomous vehicle;
wherein the joystick comprises one or more sensors that are configured to receive operator instructions from the operator, by sensing the operator's physical engagement of the joystick, including the operator's designation of the second location for the autonomous vehicle to be automatically moved to via the operator's engagement of the joystick; and
wherein the onboard computer processor is configured to implement the operator instructions by providing computer instructions to the powertrain to automatically, physically move the autonomous vehicle to the second location as requested via the operator's physical engagement of the joystick on the external surface of the autonomous vehicle.

* * * * *